United States Patent [19]
Maltz

[11] 3,952,314
[45] Apr. 20, 1976

[54] ELECTROLYTIC PEN

[75] Inventor: Martin S. Maltz, Missisagua, Canada

[73] Assignee: Xerox Corporation, Stamford, Conn.

[22] Filed: Nov. 25, 1974

[21] Appl. No.: 526,559

[52] U.S. Cl. .................. 346/140 R; 204/224 R; 346/74 E
[51] Int. Cl.² .................. G01D 15/16; G01D 15/18; G01D 15/06; C25D 17/00
[58] Field of Search .............. 204/224 R, 2; 178/62; 346/140, 143, 74 E

[56] References Cited
UNITED STATES PATENTS

| | | | |
|---|---|---|---|
| 1,550,048 | 8/1925 | Ruben | 178/62 |
| 1,796,584 | 3/1931 | Volmer | 178/62 X |
| 2,071,967 | 2/1937 | Büngner | 346/140 X |
| 3,270,637 | 9/1966 | Clark | 346/140 UX |
| 3,308,475 | 3/1967 | Bean | 346/140 |

*Primary Examiner*—G. L. Kaplan

[57] ABSTRACT

A display and/or marking pen for use with an electrolytic type ink effective when subjected to an electric current to change color. The improved pen has activating electrodes strategically disposed adjacent the ink discharge orifice designed to create the desired color changing current as the ink passes therethrough. In one embodiment, the pen consists of an electrode pair arranged in concentric fashion while in a second embodiment, a multiple electrode arrangement provides a pen having multiple stylii.

1 Claim, 4 Drawing Figures

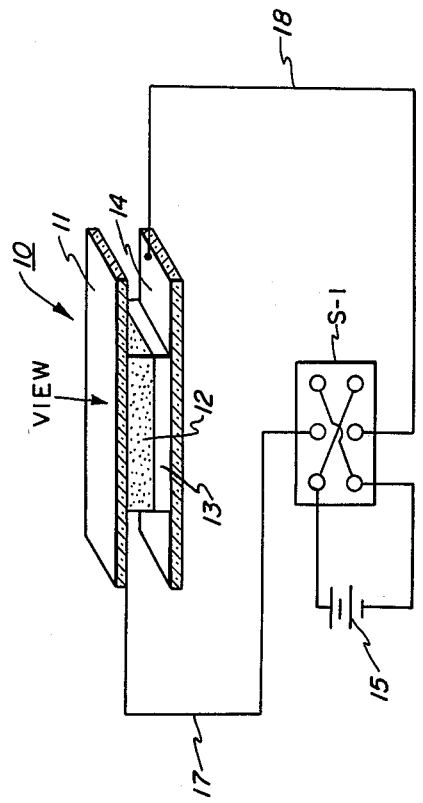
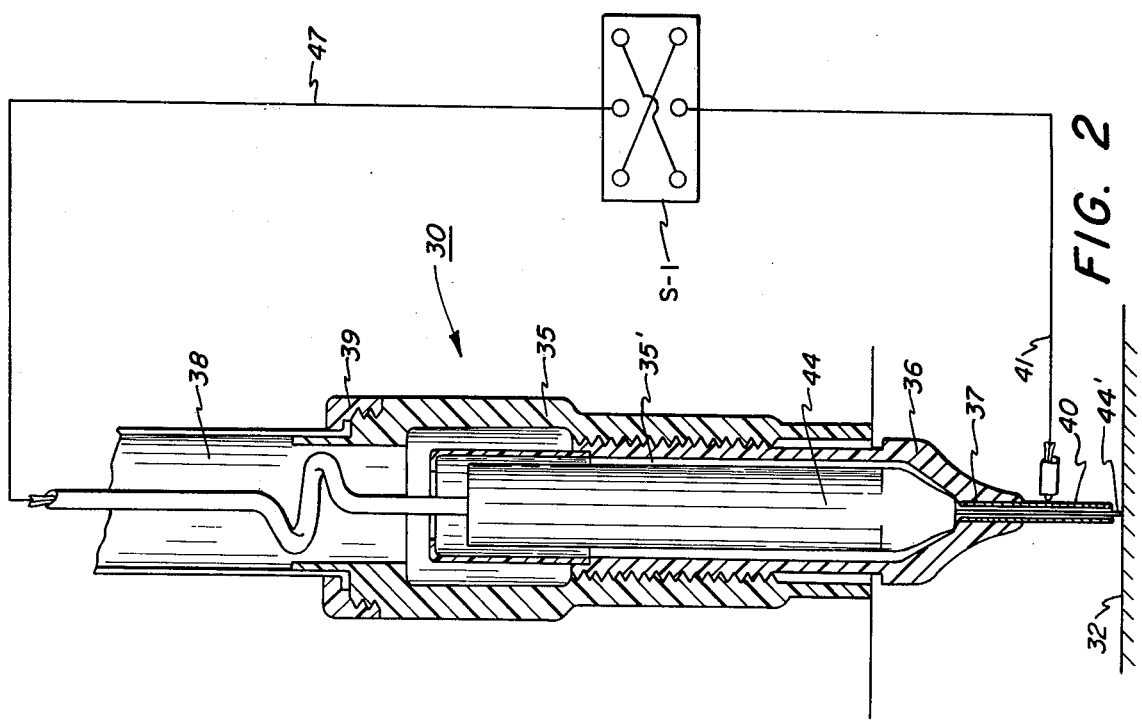

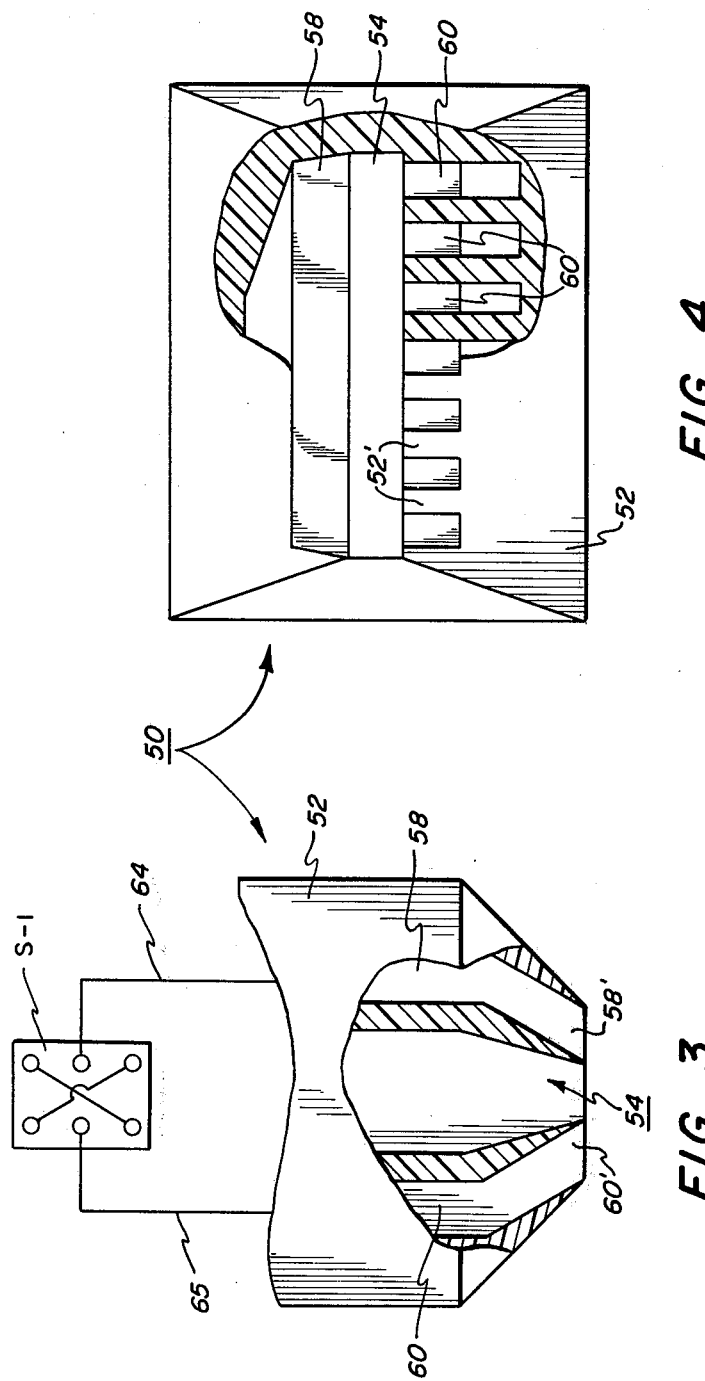

ELECTROLYTIC PEN

This invention relates to electrolytic displaying and/or recording and more particularly to an improved pen for effecting such display and/or marking.

Present day technology is aware of electrolytic indicator solutions, i.e. electrolytic inks, which undergo a color change when the acidity thereof is altered. Indeed, the pH of a solution connotes the acidity of the solution. A pH value below 7 which is neutral indicates an acid condition while a pH above 7 indicated an alkaline state. The color changing property of indicators or electrolytics has been utilized in record mediums known in the art. However, in these prior art devices a solution is prepared that undergoes a chemical reaction resulting in a change in pH which in turn causes a color change characteristic of the compound in the solution. For example, U.S. Pat. No. 3,402,109 to Berman et al teaches that when a record medium or sheet is impregnated with an electrolytically conducting solution containing a compound selected from the group consisting of absorbic acid and erythorbic acid with a silver anode placed on one side of the sheet and a cathode on the other side of the sheet, a dense blue-black mark is formed where the paper is contacted by the anode. Silver ions are released into the paper during current flow between the anode and cathode by electrolytic erosion of the anode. These ions are reduced to metallic silver ions by the action of the absorbic or erythorbic acid leaving a blue mark on the paper. This process produces a color change on the impregnated paper by the result of two distinct processes; namely, a reduction process of chemical reaction and a pH change resulting from the reduction process.

It has been discovered that the color of an indicator solution whose pH range is very nearly the value of the pH at which the solution changes color can be changed by passing a current through the solution. In this, it is not ordinarily necessary to precede the change in pH with a chemical reaction. Further, the color change may often be reversed by reversing the current.

Heretofore, one way of accomplishing the aforementioned change in color required that the solution or ink be held in a porous medium, i.e., the writing material. This material is then disposed between a pair of electrodes. In this way, the current required to effect a color change may then be created through the ink bearing writing material.

A significant problem with this arrangement is that the color changing current is passed through the writing surface itself which in turn requires that the writing surface be thoroughly preinked, if the requisite current conducting path through the writing material is to be obtained. If pre-inking of the writing material is not desirable, the ink could instead be applied by means of a hollow writing instrument, a pen, but in that case the speed of the pen would have to be restricted to assure thorough wetting of the writing material in order to provide the necessary current conducting path.

It is a principle object of the present invention to provide a new and improved pen for electrolytic inks.

It is a further object of the present invention to provide an electrolytic marking or writing instrument having built-in electrodes.

It is an object of the present invention to provide an improved pen for use with electrolytic inks which avoids the need for passing the color change triggering current through the writing medium.

It is a further object of the present invention to provide an electrolytic marking pen adapted for high speed operation without clogging or electrical arcing.

This invention relates to a pen adapted for use with electrolytic inks comprising, in combination, a housing defining a passage for the ink, the housing including a relatively large orifice through which the ink discharges onto the surface of a substrate, being marked, ink color control means for passing an electric current through the ink as the ink discharges from the orifice to trigger a predetermined change in ink color, the color control means including a direct current source, a series of discrete electrodes forming a first wall portion of the orifice for connection to one terminal of the direct current source, and a common electrode forming a second wall portion of the orifice opposite the first wall portion for connection to the opposite terminal of the direct current source whereby to provide a color triggering current throughout the ink discharging through the orifice.

In order to gain a better understanding of the invention, as well as other objects and further features thereof, reference is made to the following detailed description of the invention to be read in conjunction with the accompanying drawings, wherein:

FIG. 1 shows a cross sectional view of an indicator cell;

FIG. 2 is a cross sectional view of the electrolytic display and/or marking pen;

FIG. 3 is a cross sectional view of a multistylii embodiment of the marking pen of the present invention; and FIG. 4 is a bottom view of the pen shown in FIG. 3.

Referring now to FIG. 1, there is shown a schematic cross sectional view of an electrolytic cell generally shown at 10 for use in explaining the principle of operation of the improved electrolytic display and/or recording pen of the present invention. A layer 12 which may be an absorbent or porous sheet of filter paper impregnated with an indicator such as a compound of phenolphthalein overlays another absorbent layer of filter paper 13 without an indicator. Layers 12 and 13 are disposed in an electrically conductive relation between electrodes 11 and 14. Both electrodes 11 and 14 may comprise thin films of electrically conductive material such as tin foil or the like. In addition, electrode 11 may be made of a transparent glass with a conductive coating such as is known in the art. Furthermore, layer 13 may be omitted entirely. Electrodes 11 and 14 are connected by wire conductors 17 and 18 respectively to a reverse polarity switch S1. The reverse polarity switch S1 connects a source of potential 15 across electrodes 11 and 14.

Cell 10 is activated by wetting the porous layer 13 with a solution having a pH very near the value of pH at which the indicator or ink in layer 12 changes color. Where phenolphthalein is the indicator, ordinary tap water is used as an activator solution. When switch S1 is closed a current of approximately 60 ma. at a voltage of approximately 20 volts is passed through cell 10 and an internal pH gradient is set up across the cell causing layer 12 impregnated with the indicator to revert to a red characteristic pH color state. If the direction of the current through cell 10 is now reversed, the pH gradient will change the indicator layer 12 to its neutral characteristic color. By utilizing pH indicators which go through a number of color changes at various pH ranges it is possible to set and control the color of the cell by altering cell current. Once the color has been set the current can be removed and the cell will remain in this color.

This following table lists some examples of indicators or inks. However, the invention is not intended to be limited to the examples specified and it will occur to those skilled in the art that other indicators could be used in practice of the invention.

Table I

| Indicator | Approximate pH Range | Color Change |
| --- | --- | --- |
| Bromophenol blue | 3.0 – 4.6 | Yellow, red or blue images on white background |
|  | 6.0 – 7.6 |  |
| Cresol red | 0.2 – 1.8 | Red to yellow |
|  | 7.0 – 8.8 | Yellow to red |
| Phenolphthalein | 8.0 – 9.8 | Red image on white background |
| Thymolphthalein | 9.3 – 10.5 | Blue-black image on white background |

Porous layer 12, if a red image is desired, may be impregnated with phenophthalein by (1) preparing a 1% by weight solution of methyl alcohol and phenophthalein; (2) spraying layer 12 with the solution and allowing the alcohol to evaporate; and (3) allowing the sensitized layer 12 to be activated by de-ionized or ordinary tap water.

If a blue image is desired, a cell may be constructed in the manner described above but employing bromophenol blue as an indicator. A bromophenol blue indicator is yellow in the acid or low pH range of approximately 3.0 and is a deep blue in the neutral pH range of approximately 7.0. Bromophenol blue also has a narrow transition range wherein a slight change in Ph will cause the color to shift reversibly from yellow to red to blue.

In preparing a display having a blue image, a solution of dilute ammonium hydroxide and bromophenol blue is mixed and hydrogen chloride is added up to the point at which the solution begins to turn red. The solution is then poured onto a porous member or filter paper and allowed to dry. The dry filter paper is then cut and placed into a cell. When current is applied to the cell the indicator turns yellow. Reversing the polarity of the current causes the cell to turn blue. When the current through the cell is reduced, applying an opposite polarity pulse causes the cell to revert to its red neutral color.

Similarly, other sensitized sheets can be prepared in the manner described using cresol red and thymolphthalein. As an alternative, the indicators or inks may themselves be applied directly to the material being marked through the use of a pen. In this circumstance the material being marked may comprise ordinary paper.

In FIG. 2, there is shown a display and/or recording pen or stylus 30 consisting of a generally cylindrical outer casing or housing 35 of non-conductive material. Housing 35 which has hollow, forms an internal compartment 35' through which ink passes as will appear. A nozzle-like member 36 is appended to the lower end of housing 35. Nozzle member 36 has passage 37 therein leading to the internal compartment 35' in housing 35. Housing 35 in turn communicates with a tube-like ink supply conduit 38. A portion of the exterior of housing 35 may be threaded as at 39 to permit attachment of pen 30 to a support structure (not shown).

A cylindrical outer electrode 40 projects from the nozzle member 36, and is suitably attached thereto. Outer electrode 40, which is comprised of a suitable conductive material such as metal, is hollow to permit ink to flow from supply conduit 38 through compartment 35' and out electrode 40 onto substrate 32. Lead 41 connects electrode 40 through switch S1 to the potential source 15.

A combination valve and electrode member 44, the dimension of which is less than the interior dimension of the internal ink compartment 35' of housing 35, is disposed within compartment 35. The lower end of member 44 is reduced at 44' and projects through outer electrode 40, the outer dimension of electrode 44' being less than the inner dimension of the electrode 40. Electrode 44 is suitably supported within compartment 35', the lower end of electrode 44 seating against the interior of nozzle member 36 to close off the flow of ink to electrode 40. The length of inside electrode 44' is sufficient to permit the end thereof to project slightly beyond the lower end of electrode 40 when electrode 44 is seated on nozzle member 36. Inside electrode 44 is comprised of a suitable conductive material such as metal and is connected by means of lead 47 through switch S1 to d.c. power source 15.

In use, pen 30 is suitably suspended above the medium 32 for movement of the lower end thereof into engagement with the surface of medium 32. When it is desired to provide a visible display, the lower end of pen 30 is brought into engagement with the medium 32 to raise, via inner electrode 44', valve member 44. Unseating of valve member 44 permits ink to feed from electrode 40 and onto the medium 32 in a fine stream. At the same time, switch S1 is thrown to connect electrodes 40, 44 across power supply 15. The flow of current between the electrodes 40, 44 and through the ink passing through electrode 40 induces a chemical reaction as described heretofore to change the ink to a predetermined color. By selectively feeding ink to pen 30 with concurrent actuation of switch S1, pen 30 generates a desired colored display or mark.

Referring to FIGS. 3 and 4, a multi-stylii pen 50 is there shown, pen 50 being suitable for high speed writing. Pen 50 includes a non-conductive body 52 having a nozzle or slot-like opening 54 therethrough, opening 54 communicating with a suitable source of ink (not shown). The lower or discharge portion of opening 54 is beveled inwardly in a complementary manner. An elongated common electrode 58 imbedded in or otherwise disposed within the pen body 52 is provided along one side of nozzle 54, the lower terminal end 58' of electrode 58 forming one side boundary of the nozzle 54.

A series of individual electrodes or stylii 60 are disposed in spaced parallelism along the opposite side of nozzle 54, stylii 60 being suitably imbedded in or otherwise supported in pen body 52. As seen in FIG. 4, a portion 52' of the pen body 52 separates and electrically isolates the individual stylii from each other. The individual stylii 60 which cooperate with electrode 58 to provide the necessary color changing triggering current throughout the ink as the ink discharges through nozzle 54 without arcing, have inwardly canted lower ends 60' which cooperate with adjoining portions 52' of the pen body 52 to form the opposite side boundary of the nozzle 54.

Common electrode 58 is connected by means of lead 64 to one terminal of switch S1 while the individual electrodes 60 are connected by means of common lead 65 to the other terminal of switch S1.

In use, pen 50 is suitably supported for writing or marking engagement with the substrate 32. When it is desired to write or mark, pen 50 is brought into contact with substrate 32. At the same time, switch S1 is closed to place opposite potentials on electrodes 58 and 60 respectively. Ink from the ink supply (not shown) discharges through nozzle 54 onto the substrate. The resulting current passing through the electrolytic ink discharging from nozzle 54 creates the aforedescribed reaction in the ink to produce the desired color.

As will be understood, the effective size of the writing tip of pen 50 is relatively large. This permits a relatively large and hence unfettered discharge nozzle 54 with high non-clogging characteristics capable of relatively high speed writing. By this arrangement, any generated gas during the electrolytic process from current flow between electrode 58 and the multiple electrodes 60 is released outside pen 50. As a result, any tendency for the pen 50 to skip due to gas or vapor lock of the ink within the pen is avoided.

While the invention has been described with reference to the structure disclosed, it is not confined to the details set forth, but is intended to cover such modifications or changes as may come within the scope of the following claims.

What is claimed is:
1. In a color display and marking apparatus, the combination of:
a housing defining a conducting passage for electrolytic ink, said housing forming a slot-like ink discharge orifice at the terminal end thereof through which said ink passes when generating a color display or marking a substrate material, and said housing being comprised of an electrically non-conductive material,
means forming a series of positive and negative electrode pairs between which said ink passes prior to discharge of said ink from said housing orifice.
one of said electrode pairs comprising an electrically conductive member in said housing and extending along one side of said slot-like discharge orifice, said one electrode member being separated from said discharge orifice by said housing,
the other of said electrode pairs comprising a series of discrete electrically conductive members in said housing and extending along the opposing side of said slot-like discharge orifice, said other electrode members being separated from said discharge orifice and one another by said housing,
said electrode pairs serving to permit a color triggering electric current wave to be passed through said ink to change said ink to a preset display and marking color.

* * * * *